Dec. 17, 1968   R. E. LEVIN   3,416,862

OPTICAL SYSTEM FOR PHOTOCOPYING

Filed July 1, 1966

ROBERT E. LEVIN
*INVENTOR.*

BY Lawrence Burns,
ATTORNEY

United States Patent Office 3,416,862
Patented Dec. 17, 1968

---

3,416,862
OPTICAL SYSTEM FOR PHOTOCOPYING
Robert E. Levin, Hamilton, Mass., assignor to Sylvania Electric Products Inc., a corporation of Delaware
Filed July 1, 1966, Ser. No. 562,144
3 Claims. (Cl. 355—70)

This invention relates to the uniform illumination of a surface such as the glass platen used in photocopy machines and is in part a continuation of my copending application for a lensed fluorescent lamp, filed concurrently herewith.

The "travelling slit" type of illumination is often used, in which an aperture fluorescent lamp travels across the platen in synchronism with the optical image scanning.

For higher speed copying, more light is required, and an additional lamp is generally added, the two lamps traveling as a pair.

Even this is not sufficient for very high speed work, where a still greater amount of light is required, and yet there is not much room in most photocopy machines for additional optical apparatus or lamps. Larger apertures can be used in the lamps to increase the solid angle of the source subtended at the platen, but that reduces the source luminance.

I have discovered that the use of an aperture lamp with a cylindrical lens, concave on one side to fit over the aperture and be in contact with the lamp envelope, will greatly increase the solid angle of the source subtended at the platen without significantly diminishing the source luminance. This directly increases the illumination of the platen. The illumination can be still further increased by the use of an additional lamp set near the platen but with its aperture facing backward into a reflector which directs the light to the platen to add to that of the lamp-lens combination. The reflector for the second lamp can be at the side of the lens for the first lamp, and the entire unit, the lamps plus the lens and reflector, can move together as a traveling source.

An additional set of lamps, reflector and lens, can be be used on the other side of the centerline of the illuminated portion of the platen, as a sort of mirror image of the first set, the arrangement being symmetrical about the centerline, and the whole combination of four lamps, two lenses and two reflectors moved together as a simple unit. Because no great depth is required, only five or six inches in some cases, the system will readily fit into the space available in a fast copying device. The light from the reflector and lens should generally be directed to the platen at an angle, to leave a clear view of the illuminated portion to the apparatus for receiving it on the photosensitive element used in such photocopiers, generally a selenium drum.

Further objects, advantages and features of the invention will be apparent from the following specification taken in connection with the accompanying drawing, in which.

Figure 1:
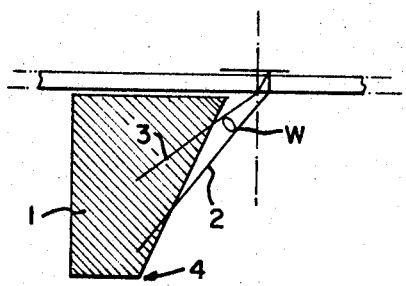
FIGURE 1 is a schematic drawing, showing the limits of available space in a typical photocopier.

The space available for the illuminating devices described herein is outlined in FIG. 1. The light beam of course, will in part fall outside the outlined space, for example, in the vicinity of the platen, but the illuminating equipment must be within it in order to leave room for receiving an image on the photosensitive material, as pointed out above.

Figure 2:
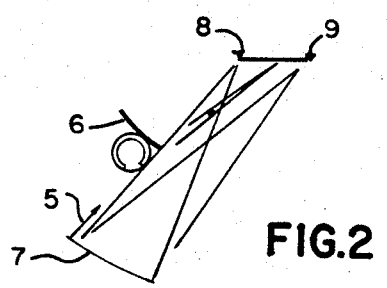
FIGURE 2 shows the masking effect which can occur with a lamp and reflector.

The platen illumination at a point is proportional to the solid source angle seen from the platen. By maximizing this angle integrated for all points on the viewing aperture, a maximum irradiation is obtained. FIGURE 1 shows the allowable limits for the system as a cross-hatched zone 1. W is a section of the required solid angle; line 2 should be as low as possible and line 3 should be as high as possible. If a reflector is used in the bottom to provide flux from the vicinity of point 4, the lamp above it will induce a masking affect as shown for ray 5 in FIGURE 2. Reflector 6 is to add flux from the point where reflector 7 ceases to be effective. If reflector 6 gives complete fill at point 8, point 9 does not see complete flashing (as shown) and vice versa. Modified forms using lamps of large aperture can resolve this from a practical standpoint but large apertures reduce source luminance.

Figure 3:
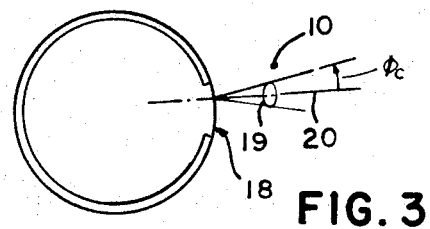
FIGURE 3 is a view of an optical medium in contact with an aperture lamp.
Figure 4:
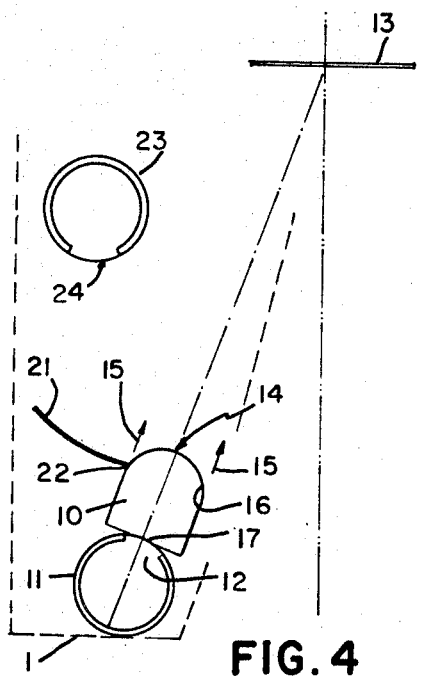
FIGURE 4 shows schematically an optical arrangement according to the invention.

A lens 10 can be located near the bottom of the permitted region 1 with an aperture lamp 11 behind the lens as shown in FIGURE 4. The finite lamp aperture 12 transfers maximum flux for the finite viewing slit 13 when it is completely flashed from all points on the viewing slit. The paraxial element of the cylindrical lens 14 can be chosen as a circular imaging section. Off-axis rays 15 are aberrated, and an elliptical form 16 will keep the off axis rays "focused" on the slit. No imaging is required. The source aperture 12 is a place optically within the refractive element 10 by matching the back surface 17 curvature to the lamp curvature. This returns all first surface reflected light into the lamp 11 to increase the aperture luminance. The optical source 18 within the refractive media 10 radiates through cone 19 symmetrical about a normal 20 to the surface and having a half-angle equal to the critical angle of the media (see FIGURE 3).

To prevent parallax from any point on the slit zone of the platen, the reflective element 21 should join the edge of the refractive element as shown at point 22. The lamp 23 for the reflective element 21 must be high to avoid masking the reflector 21; but as it is moved up, the aperture 24 size increases thus decreasing the aperture luminance. Therefore it must be as low as possible without masking. The reflector 21 can be made circular in section since image destroying aberrations are of no consequence as long as the flux transfer from the reflector to the slit ultimately occurs. The aperture 24 was about 30° and aperture 12 of lamp 11 about 15° in the arrangement of FIG. 4 with excellent results, although these angles can be varied.

What I claim is:

1. An optical system for illuminating a slit, said system comprising: a tubular lamp having a fluorescent coating with a longitudinal aperture therein; an elongated lens having a concave portion fitting over the lamp and in register with said aperture, said lens and lamp being positioned to direct light onto said slit; a second tubular lamp having a fluorescent coating with an aperture therein, said aperture facing away from said slit and toward a reflector; a reflector extending to the side of the lens of said first-mentioned lamp and in position to receive light from the aperture of said second-mentioned lamp, and direct it to said slit.

2. The optical system of claim 1, in which the lens and reflector reflect light to the slit at an angle with the normal plate through the centerline of the slit, the lamps being positioned off the centerline.

3. The optical system of claim 2 in combination with a substantially identical system on the opposite side of the centerline, the two systems being substantially symmetrical about the center line, with the light from both systems being directed to the same slit.

References Cited

UNITED STATES PATENTS 3,043,190  7/1962  Mandler _____ 88—24

FOREIGN PATENTS 930,548  5/1951  France.
942,086  9/1948  France.

NORTON ANSHER, *Primary Examiner.*

RICHARD A. WINTERCORN, *Assistant Examiner.*

U.S. Cl. X.R.

240—41.3, 41.1